United States Patent
Hikosaka

(10) Patent No.: US 9,625,659 B2
(45) Date of Patent: Apr. 18, 2017

(54) OPTICAL CONNECTOR

(71) Applicant: YAZAKI CORPORATION, Tokyo (JP)

(72) Inventor: Tomohiro Hikosaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/707,814

(22) Filed: May 8, 2015

(65) Prior Publication Data

US 2015/0241642 A1    Aug. 27, 2015

Related U.S. Application Data

(63) Continuation of application No. PCT/JP2013/084245, filed on Dec. 20, 2013.

(30) Foreign Application Priority Data

Dec. 21, 2012  (JP) .................................. 2012-279801

(51) Int. Cl.
*G02B 6/38* (2006.01)
*G02B 6/44* (2006.01)

(52) U.S. Cl.
CPC ......... *G02B 6/3887* (2013.01); *G02B 6/3826* (2013.01); *G02B 6/4432* (2013.01); *G02B 6/3878* (2013.01)

(58) Field of Classification Search
CPC ........ G02B 6/38; G02B 6/3807; G02B 6/381; G02B 6/3826; G02B 6/3887; G02B 6/3878; G02B 6/4432; G02B 6/4429; G02B 6/443

See application file for complete search history.

(56) References Cited

U.S. PATENT DOCUMENTS 5,396,572 A    3/1995  Bradley et al.
7,431,515 B1 *  10/2008  Penumatcha ........ G02B 6/3857
                                                385/53

(Continued)

FOREIGN PATENT DOCUMENTS

JP    3-24607 U    3/1991
JP    7-77630 A    3/1995

(Continued)

OTHER PUBLICATIONS

Machine generated English translation of JP 2012-08253A.*

(Continued)

*Primary Examiner* — John M Bedtelyon
(74) *Attorney, Agent, or Firm* — Kenealy Vaidya LLP

(57) ABSTRACT

An optical connector includes: an optical fiber cable in which an optical fiber core wire and a tensile strength material are covered by a sheathing; a ferrule; a housing which holds the ferrule; a crimping sleeve which includes: a tubular portion; a tensile strength material holding projection which is formed on an outer circumference of the tubular portion; and a sheathing holding projection which is formed on the outer circumference so as to lie further rearwards than the tensile strength material holding projection; and a crimping ring which is crimped on to the tubular portion not only to thereby hold the tensile strength material between the tensile strength material holding projection and the crimping ring but also to thereby hold the tensile strength material and the sheathing between the sheathing holding projection and the crimping ring.

6 Claims, 8 Drawing Sheets

(56) References Cited

U.S. PATENT DOCUMENTS

2002/0031311 A1 3/2002 Shiino et al.
2013/0101258 A1 4/2013 Hikosaka et al.

FOREIGN PATENT DOCUMENTS

JP 2002-90582 A 3/2002
JP 2012-8253 A 1/2012

OTHER PUBLICATIONS

International Preliminary Report on Patentability and English language Written Opinion of the International Search Report for PCT/JP2013/084245 dated Jun. 23, 2015.
International Search Report and Written Opinion of the International Search Report for PCT/JP2013/084245 dated Jan. 28, 2014.
Japanese Office Action for the related Japanese Patent Application No. 2012-279801 dated Aug. 23, 2016.

* cited by examiner

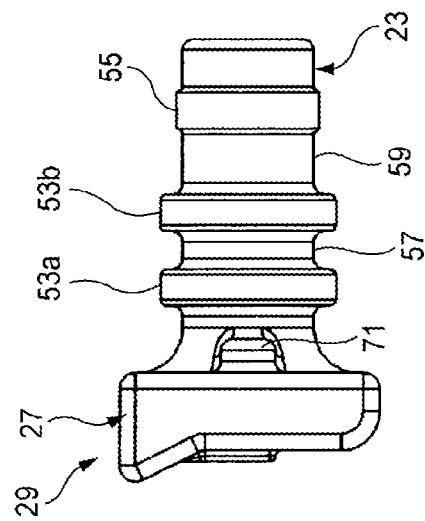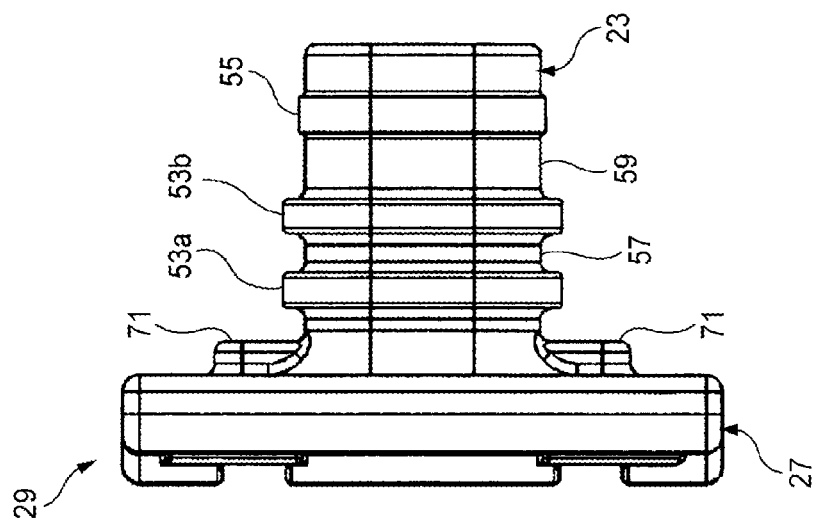

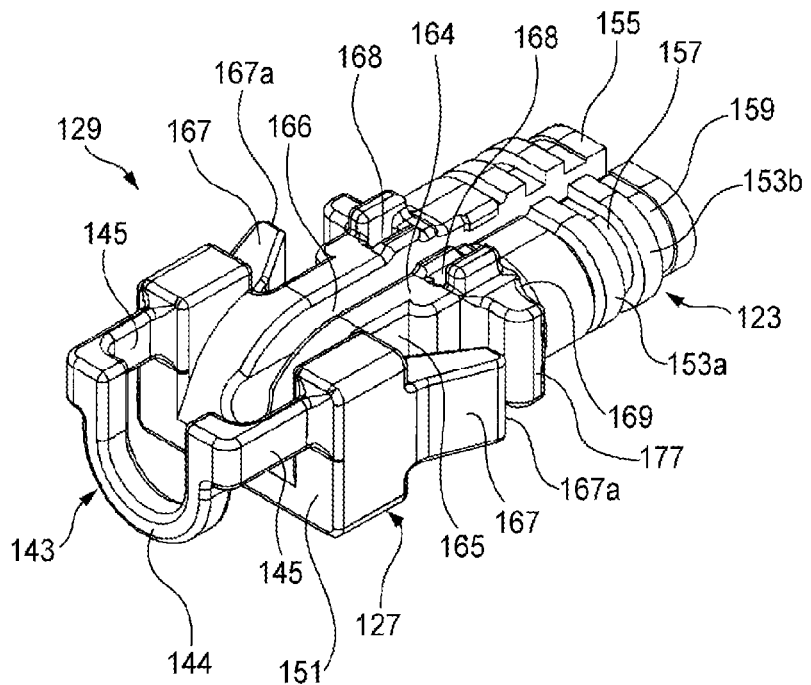
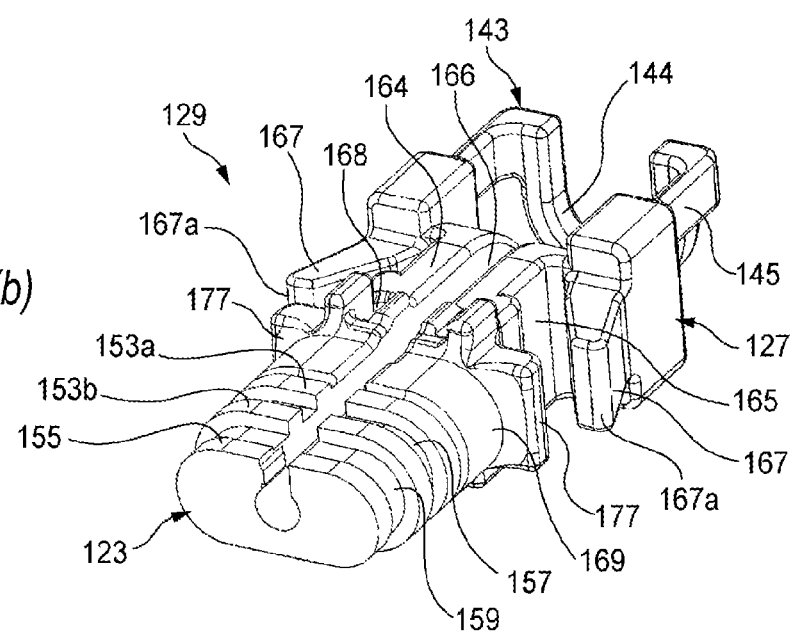

OPTICAL CONNECTOR

CROSS REFERENCE TO RELATED APPLICATIONS

This application is a continuation of PCT application No. PCT/JP2013/084245, which was filed on Dec. 20, 2013 based on Japanese Patent Application (No. 2012-279801) filed on Dec. 21, 2012, the contents of which are incorporated herein by reference.

BACKGROUND OF THE INVENTION

1. Field of the Invention

The present invention relates to an optical connector.

2. Description of the Related Art

Optical connectors are known which are used to connect optical fibers together in motor vehicles or the like (refer to JP-A-2012-8253).

As shown in FIG. 8, an optical connector 501 of this type is connected to an end portion of an optical fiber cable 509 in which optical fiber core wires 507 are covered by a covering portion 505 which has a tensile strength fiber 503. The optical connector 501 has ferrules 511 which are fixed to end portions of the optical fiber core wires 507 which are exposed from the covering portion 505, a crimping sleeve 513 through which the optical fiber core wires 507 are passed and to which the covering portion 505 is fixed, and a housing 515 where the ferrules 511 and the crimping sleeve 513 are retained. The housing 515 has an accommodating recess portion 517 of which one side is opened, and the crimping sleeve 513 has a flange portion 519 which can slide from a side of the housing 515 into the accommodating recess portion 517 to be accommodated therein.

In the assembling process of the optical connector 501, a boot 521, a crimping ring 523 and the crimping sleeve 513 are sequentially passed on the end portion of the optical fiber cable 509. At the end portion of the optical fiber cable 509, the ferrules 511 are fixed to the optical fiber core wires 507 which are exposed with a sheathing 525 and the tensile strength fiber 503 removed. In the crimping process of the crimping ring 523 on to the covering portion 505, a pressure is applied to the crimping ring 523 from the circumference thereof by the use of a squeezing tool or the like with the covering portion 505 (the sheathing 525 and the tensile strength fiber 503) held between the crimping sleeve 513 and the crimping ring 523. This elastically deforms the crimping ring 523 in a direction in which the crimping ring 532 is diametrically narrowed, whereby the sheathing 525 and the tensile strength fiber 503 are secured to the outer circumference of the crimping sleeve 513 under pressure.

Then, the crimping sleeve 513 is caused to slide from the side of the housing 515 into the accommodating recess portion 517 to be accommodated therein, while the boot 521 is disposed so as to cover the crimping ring 523 and part of the optical fiber cable 509, whereby the assembly of the optical connector 501 is completed.

In the conventional optical connector 501 described above, however, since the crimping sleeve 513 and the crimping ring 523 are fixed at the same time that the sheathing 525 and the tensile strength fiber 503 which make up the covering portion 505 of the optical fiber cable 509 are held therebetween, there is produced a slip between the sheathing 525 and the tensile strength fiber 503 which are crimped at the same time. Additionally, in general, in the optical fiber cable 509, higher slip properties (lower friction properties) are imparted to the surface of the sheathing to improve the ease with which the optical fiber cable 509 is inserted or laid out. Therefore, the crimping ring 523 which is fastened on to the sheathing 525 is easy to slip. Then, with the optical connector 501 which is connected to the optical fiber cable 509, there has been a possibility that the cable tensile strength is reduced.

SUMMARY OF THE INVENTION

The invention has been made in view of these situations, and an object thereof is to provide an optical connector which can increase the cable tensile strength relative to a housing.

The object of the invention is achieved by the following configurations.

(1) An optical connector comprising: an optical fiber cable in which an optical fiber core wire and a tensile strength material which is provided along the optical fiber core wire are covered by a sheathing; a ferrule which is fixed to an end portion of the optical fiber core wire which is exposed from the sheathing; a housing which holds the ferrule at a front thereof; a crimping sleeve which includes: a tubular portion through which the optical fiber core wire is inserted and which is let out from a rear opening in the housing; a tensile strength material holding projection which is formed on an outer circumference of the tubular portion and which is covered by the tensile strength material from which the sheathing is removed; and a sheathing holding projection which is formed on the outer circumference of the tubular portion so as to lie further rearwards than the tensile strength material holding projection and which is covered by the tensile strength material and the sheathing; and a crimping ring which is crimped on to the tubular portion not only to thereby hold the tensile strength material between the tensile strength material holding projection and the crimping ring but also to thereby hold the tensile strength material and the sheathing between the sheathing holding projection and the crimping ring.

According to the optical connector configured as described under (1) above, with the crimping ring fastened on to the outer circumference of the tubular portion, only the tensile strength material which mainly supports the tensile load of the optical fiber cable with the sheathing removed is held between the tensile strength material holding projection and the crimping ring at an axially front side of the tubular portion. In this held state, the tensile strength material is curved into a shape which follows the projecting shape of the tensile strength material holding projection, and the crimping ring is elastically deformed substantially in to the same shape so as to be fastened on to the tensile strength material so curved from thereabove. Namely, the tensile strength material and the crimping ring are curved so as to follow the tensile strength material holding projection to be placed thereover. This allows the tensile strength material to obtain high tensile strength friction which produces no slip when the tensile strength material is pulled axially relative to the tubular portion, whereby the tensile strength material can be fixed with high strength compared with a case where the tensile strength material is held together with the sheathing in a double-layer fashion. Additionally, at an axial rear side of the tubular portion, the tensile strength material and the sheathing are held at the same time between the sheathing holding projection and the crimping sleeve, whereby the tensile load relative to the sheathing is supported. This can increase the tensile strength of the optical fiber cable relative to the housing.

(2) The optical connector according to the configuration described under (1) above, wherein a tensile strength material cut-in groove is formed between a plurality of the tensile strength material holding projections which are provided along an axial direction of the tubular portion, and a sheathing cut-in groove having a wider groove width than that of the tensile strength material cut-in groove is formed between the tensile strength material holding projection which is provided rearwards and the sheathing holding projection.

According to the optical connector configured as described under (2) above, the tensile strength material and the crimping ring enter the tensile strength cut-in groove which is formed between the plurality of tensile strength material holding projections to be deformed. When pulled in the axial direction relative to the tubular portion, the tensile strength material obtains the high tensile strength friction which produces no slip relative to the outer circumferential surface of the tubular portion, whereby the tensile strength material is fixed with high strength. Additionally, by forming the sheathing cut-in groove wider than the tensile strength material cut-in groove, the sheathing which is deformed by the crimping ring being fastened is easily accommodated in the sheathing cut-in groove, thereby making it difficult for the crimping construction of the tensile strength material to be influenced by the extra length of the sheathing. This ensures the crimping of the tensile strength material.

(3) The optical connector according to the configuration as described under (1) or (2) above, wherein a projecting height of the sheathing holding projection from the outer circumference of the tubular portion is smaller than a projecting height of the tensile strength material holding projection from the outer circumference of the tubular portion.

According to the optical connector configured as described (3) above, by making the height of the sheathing holding projection lower by an extent equal to the thickness of the sheathing than the height of the tensile strength material, the outside diameter of the crimping ring after fastened can be made substantially equal between the axially front side and the axially rear side. This can simplify the construction of a boot which is installed at the rear of the housing while covering the outer circumference of the crimping ring, thereby improving the installation of the boot.

Thus, the invention has been briefly described heretofore. Further, the details of the invention will be made more clear by perusing a mode for carrying out the invention (hereinafter, referred to an "embodiment") which will be described below by reference to accompanying drawings.

BRIEF DESCRIPTION OF THE DRAWINGS

FIG. 3(a) is a plan view of a crimping sleeve shown in FIG. 1, and FIG. 3(b) is a side view of the crimping sleeve shown in FIG. 3(a).

FIG. 7(a) is a front perspective view of a ferrule holding member shown in FIG. 6, and FIG. 7(b) is a rear perspective view of the ferrule holding member shown in FIG. 7(a).

DETAILED DESCRIPTION OF THE EXEMPLARY EMBODIMENTS

Hereinafter, embodiments of the invention will be described by reference to the drawings.

An optical connector 11 according to a first embodiment of the invention is joined to a mating optical connector, not shown, whereby two optical fiber core wires 15 of an optical fiber cable 13 thereof are connected to those of the mating optical connector in such a way that distal ends of the two pairs of optical fiber core wires are butted up against each other. This enables optical fiber cables in, for example, a motor vehicle to be connected to each other.

Figure 1:
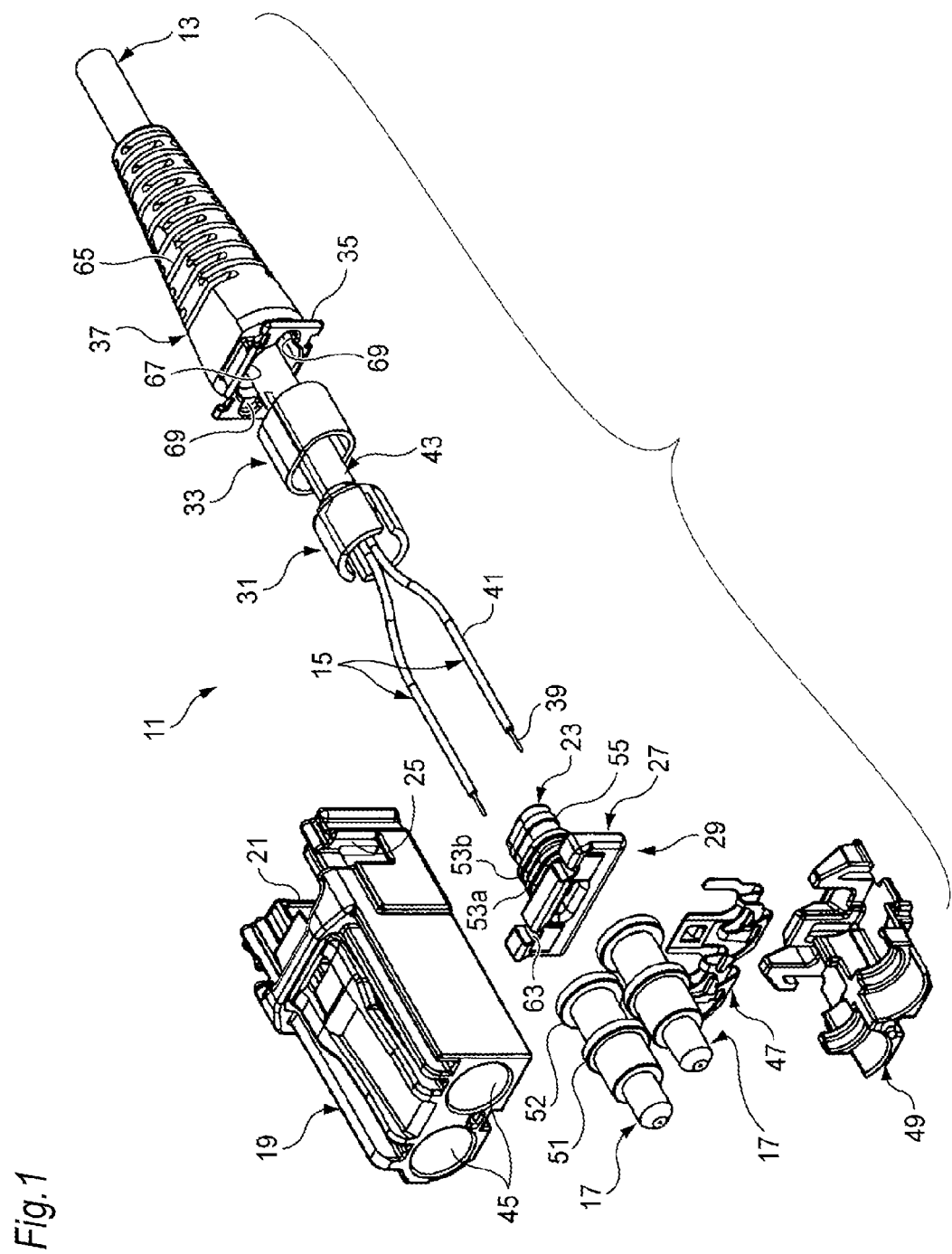
FIG. 1 is an exploded perspective view of an optical connector according to a first embodiment of the invention.
Figure 2:
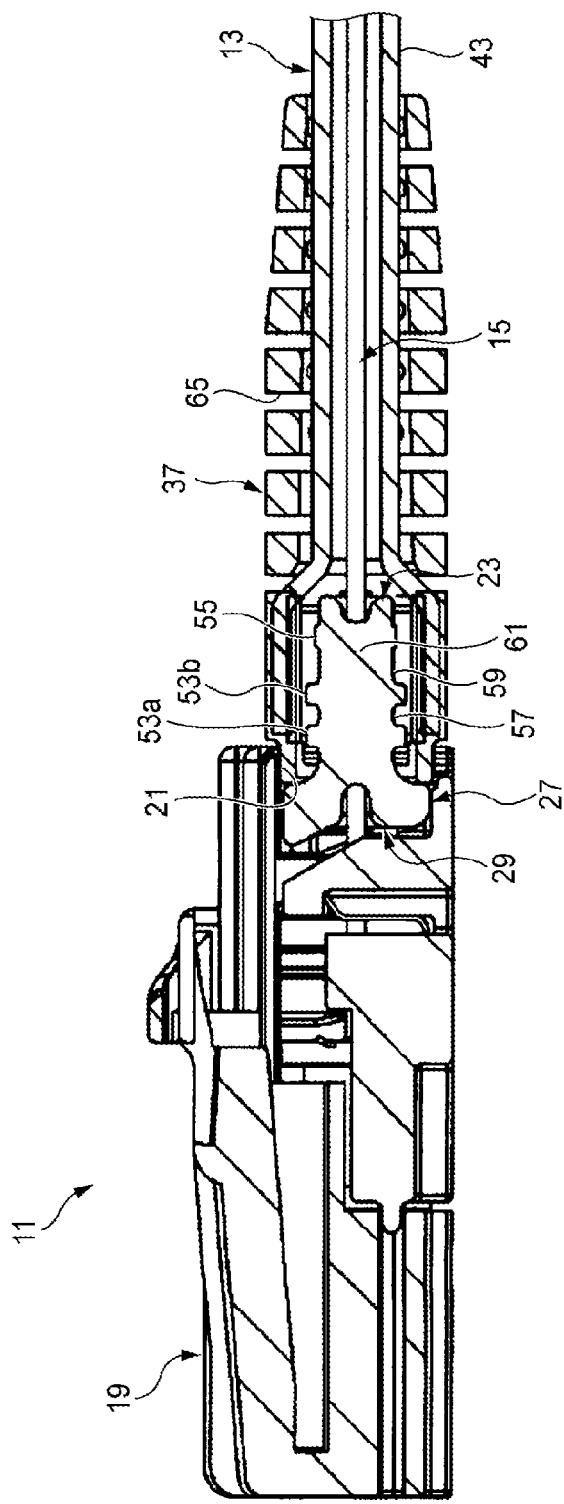
FIG. 2 is a longitudinal vertical sectional view of the optical connector shown in FIG. 1.
Figure 5A:
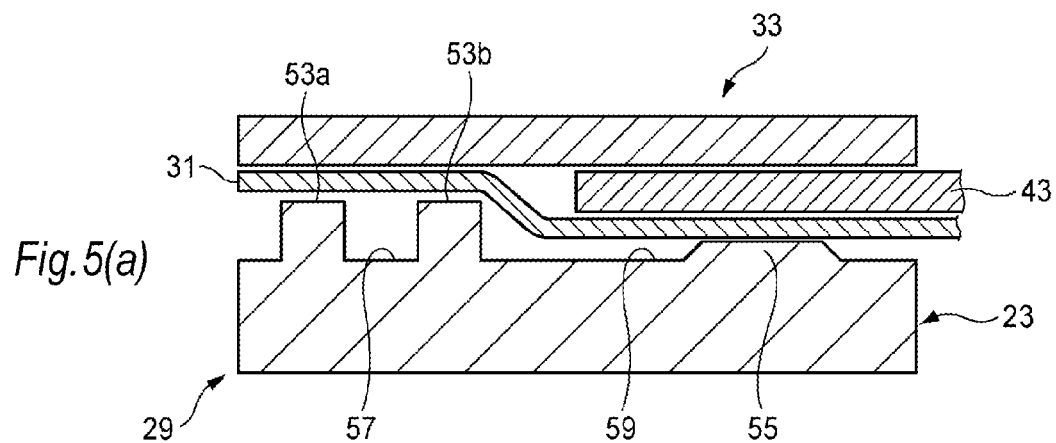
FIG. 5(a) is an enlarged sectional view of a main part of a tubular portion of the crimping sleeve before the crimping ring is fastened.
Figure 5B:
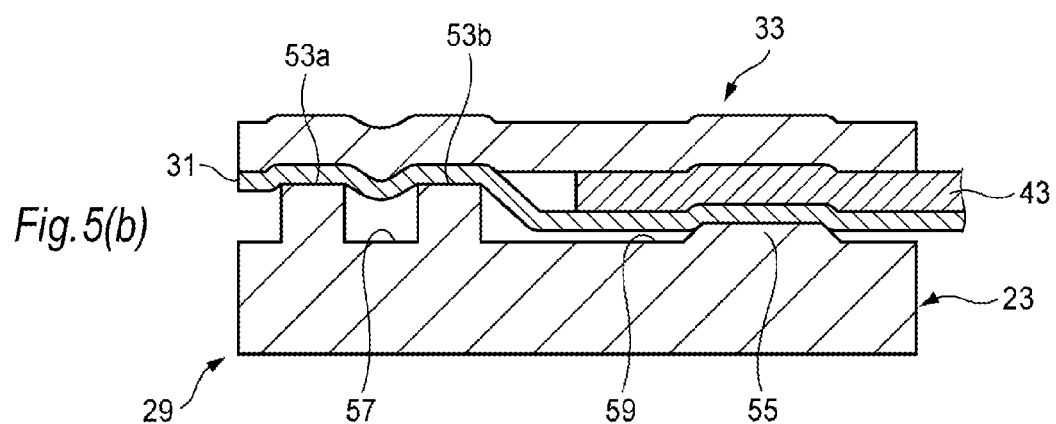
FIG. 5(b) is an enlarged sectional view of the main part of the crimping sleeve after the crimping ring is fastened.

As shown in FIGS. 1 and 2, the optical connector 11 according to the first embodiment includes a housing 19 which accommodates ferrules 17 which are connected to distal end portions of the optical fiber core wires 15 of the optical fiber cable 13, a crimping sleeve 29 having a tubular portion 23 into which the optical fiber core wires 15 are inserted and which are inserted through a sleeve through hole 21 which is a rear opening formed in a rear wall of the housing 19 and a holding flange portion 27 which is provided to continue to the tubular portion 23 and which faces an inner surface 25 of the rear wall of the housing 19, a crimping ring 33 which fixes a tensile strength fiber 31 (refer to FIGS. 5(a), 5(b)) which is a tensile strength material of the optical fiber cable 13 which is placed on an outer circumference of the tubular portion 23 and a sheathing 43, and a boot 37 having a protecting portion which covers the optical fiber cable 13 and an outer circumference of the crimping ring 33 and a locking flange portion 35 which is provided to continue to the protecting portion and which is held between the holding flange portion 27 and the rear wall inner surface 25.

In these constituent parts, the optical fiber cable 13, the ferrules 17, the crimping sleeve 29, the crimping ring 33 and the boot 37 are configured as a ferrule assy.

The optical fiber cable 13 is made up of the two optical fiber core wires 15 each made up, in turn, of a glass strand 39 which is an optical fiber strand and a protecting cover 41 which covers the glass strand 39, the tensile strength fiber 31 which is provided (to extend axially) along the outside of the optical fiber core wires 15 externally and the sheathing 43 which covers an outer circumference of the tensile strength fiber 31.

The tensile strength fiber 31 prevents the disconnection of the glass strands 39 by an external force (a tensile force). The tensile strength fiber 31 may take the form of a single fiber, a plurality of fibers or a braid. Aramid fiber such as poly(p-phenylene terephtalamid) fiber, polyarylate fiber, poly(p-phenylene benzbisoxazole) fiber, polyester-system fiber such as polyethylene terephthalate fiber, nylon fiber and the like are used as the tensile strength fiber 31.

The housing 19 formed of synthetic resin has joining opening portions 45 with the mating optical connector, not shown, at the front thereof. The pair of ferrules 17 are individually accommodated on a deep side of the joining opening portions 45 (at the front of the housing 19).

The optical fiber core wire 15 which is exposed from the optical fiber cable 13 as a result of the sheathing 43 and the tensile strength fiber 31 being removed therefrom is inserted in each ferrule 17 to be fixed therein. The protecting cover 41 is further removed from a distal end of each optical fiber core wire 15 to expose the glass strand 39. The glass strand 39 is inserted into a strand insertion hole which is provided at a distal end of each ferrule 17. These ferrules 17 are accommodated in the housing so as to freely move axially and are biased elastically to the front by a plate spring (a spring member) 47 which is accommodated in the housing 19. This plate spring 47 is prevented from being dislocated from the housing 19 by a stopper 49.

A first annular portion 51 and a second annular portion 52, which make a pair, are provided on an outer circumferential surface of each ferrule 17 so as to project therefrom. The ferrule 17 is elastically biased to the front by the plate spring 47 and is brought into abutment with a stopper wall which is provided in a ferrule accommodating hole so as to project therefrom at the first annular portion 51, whereby the ferrule 17 is prevented from projecting to the front any further. The ferrule 17 is butted up against a ferrule 17 of the mating optical connector for connection therewith at a connecting end face. This enables the optical fiber core wire 15 whose end is now prepared for connection by the ferrule 17 to be connected with an optical line of the mating optical connector.

When it is butted up against the mating optical connector, the ferrule 17 can be pushed in slightly to the rear in a connecting direction within an elastic deformation range of the plate spring 47. This prevents the ferrule 17 from being damaged or broken by an extreme stress concentration. Thus, the ferrule 17 is configured so as to obtain a target connection loss stably as a result of the biasing force of the plate spring 47 acting as the force with which the ferrules are butted up against each other.

The sleeve through hole 21 is formed in the rear wall of the housing 19. The optical fiber core wires 15 which are connected to the corresponding ferrules 17 are put through the sleeve through hole 21. The crimping sleeve 29 is interposed between the optical fiber core wires 15 and the sleeve through hole 21. Namely, the housing 19 holds the crimping sleeve 29 through which the optical fiber core wires 15 are inserted.

As shown in FIGS. 3(a), 3(b), the crimping sleeve 29 of the first embodiment is made of a hard resin material and has the flat tubular portion 23 through which the optical fiber core wires 15 are inserted inwardly and which is put through the sleeve through hole 21 in the housing 19. The tensile strength fiber 31 and the sheathing 43 are placed over an outer circumference of the tubular portion 23. The tensile strength fiber 31 and the sheathing 43 are crimped to be fixed to the tubular portion 23 by the crimping ring 33.

In the crimping sleeve 29 of the optical connector 11 according to the first embodiment, tensile strength material holding projections 53a, 53b and a sheathing holding projection 55 are provided on the outer circumference of the tubular portion 23. The tensile strength material holding projections 53a, 53b are covered by the tensile strength fiber 31 from which the sheathing 43 is removed. Additionally, the sheathing holding projection 55 is formed rearwards of the tensile strength material holding projections 53a, 53b and is covered by the tensile strength fiber 31 and the sheathing 43.

The crimping sleeve 29 of the first embodiment is made to crimp concentrically only the tensile strength fiber 31 by providing the tensile strength fiber holding projections 53a, 53b and the sheathing holding projection 55 independently. Additionally, the sheathing holding projection 55 prevents the slip of the sheathing 43 only which would occur as a result of the sheathing 43 being pulled. In the first embodiment, the tensile strength material holding projections 53a, 53b and the sheathing projection 55 are formed as annular projections which continuously extend along the outer circumference of the tubular portion 23 in a circumferential direction. The tensile material holding projections 53a, 53b and the sheathing holding projection 55 may, of course, be provided to project intermittently in the circumferential direction.

As shown in FIG. 5(a), the crimping ring 33 is placed entirely on the tubular portion 23 of the crimping sleeve 29 over the tensile strength fiber 31 which is placed on the tensile strength material holding projections 53a, 53b and the tensile strength material fiber 31 and the sheathing 43 which are placed on the sheathing holding projection 55. Then, as shown in FIG. 5(b), the crimping ring 33 is crimped on to the tubular portion 23, thereby not only holding the tensile strength fiber 31 between the tensile material holding projections 53a, 53b and itself but also holding the tensile strength fiber 31 and the sheathing 43 between the sheathing holding projection 55 and itself.

Figure 4A:
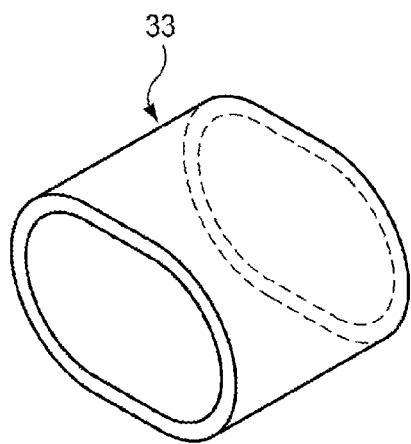
FIG. 4(a) is a perspective view of a crimping ring which uses a seamless tube.
Figure 4B:
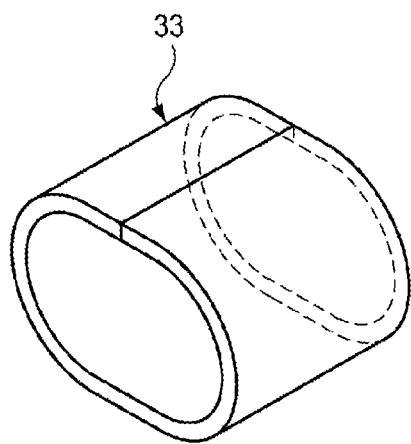
FIG. 4(b) is a perspective view of the crimping ring which is formed by bending a plate.

Here, the crimping ring 33 is made of a metallic tubular material which is easy to be elastically deformed or the like, and a simple tubular material as shown in FIG. 4(a) can be used for the crimping ring 33 in consideration of productivity. In this case, as the crimping ring 33, a seamless tube (a tube without any joint or joining portion) which is formed through extruding or drawing is used to be cut to a certain length as required. Alternatively, as shown in FIG. 4(b), the crimping ring 33 may be made of a pseudo-ring-like material which is formed by bending a plate-like material into such a shape. Serrations may be provided on the crimping ring 33, or a stepped groove may be provided circumferentially on the crimping ring 33.

Additionally, as shown in FIGS. 3(a), 3(b), in the optical connector 11 according to the first embodiment, a tensile strength material cut-in groove 57 is formed between the plurality of (two in this embodiment) tensile strength material holding projections 53a, 53b which are provided to be aligned in an axial direction of the tubular portion 23. In addition, a sheathing cut-in groove 59 is formed between the rear tensile strength material holding projection 53b and the sheathing holding projection 55, and this sheathing cut-in groove 59 has a groove width which is wider than that of the tensile strength material cut-in groove 57.

In the crimping sleeve 29 of the optical connector 11 according to the first embodiment, a projecting height of the sheathing holding projection 55 from the outer circumference of the tubular portion 23 is set lower than a projecting height of the tensile strength material holding projections 53a, 53b from the outer circumference of the tubular portion 23.

A rectangular holding flange portion 27 is provided at the front of the tubular portion 23 of the crimping sleeve 29 in such a way as to connect continuously (or to continue) to the tubular portion 23. A through space is formed in the holding flange portion 27 and the tubular portion 23 so as to penetrate them in a front-to-rear direction. A bulkhead portion 61 is provided inwards of the tubular portion 23 of the crimping sleeve 29 so as to partition the through space (refer to FIG. 2).

A pair of recess portions 63 are formed on an upper edge of the holding flange portion 27 so as to be brought into engagement with ribs, not shown, which are formed inside the housing 19. The crimping sleeve 29 is assembled into the housing 19 in such a way that the tubular portion 23 is passed through the sleeve through hole 21 in the rear wall and that the holding flange portion 27 faces the rear wall inner surface 25.

In the optical fiber cable 13, the optical fiber core wires 15 are put through to the front from the tubular portion 23 of the crimping sleeve 29, while the tensile strength fiber 31 and the sheathing 43 are placed over the outer circumference of the tubular portion 23. The tensile strength fiber 31 and the sheathing 43 which are placed over the tubular portion 23 are fastened to be fixed to the tubular portion 23 by being crimped externally by the crimping ring 33 which is crimped. This fixes the optical fiber cable 13 and the crimping sleeve 29 together integrally. Additionally, when the optical fiber cable 13 is pulled to the rear, the holding flange portion 27 is brought into abutment with the rear wall so as to restrict the dislocation of the crimping sleeve 29. In this way, a floating construction is provided as the construction for preventing the dislocation of the crimping ring 33 and the crimping sleeve 29.

The boot 37 is made of a soft material such as rubber and has a protecting portion which covers outer circumferences of the optical fiber cable 13 and the crimping ring 33. A plurality of circumferential grooves 65 are formed around a circumference of the protecting portion, and an appropriate bending characteristic is imparted to the protecting portion by those circumferential grooves 65. The boot 37 is assembled to the housing 19 with the locking flange portion 35 held between the holding flange portion 27 of the crimping sleeve 29 and the rear wall inner surface 25 of the housing 19.

A ring accommodating hole 67 (refer to FIG. 1) is formed concentrically in the boot 37 for the crimping ring 33 to be accommodated therein. The ring accommodating hole 67 is opened in the center of the locking flange portion 35. A pair of projection locking holes 69 are formed inwards of the locking flange portion 35 in such a way as to hold the ring accommodating hole 67 therebetween. The pair of projection locking holes 69 are disposed to the left and right of the tubular portion 23 of the crimping sleeve 29 so as to hold the tubular portion 23 therebetween. In this first embodiment, the projection locking holes 69 are formed into a C-shape and share their circumferences with the ring accommodating hole 67, being made to open to the ring accommodating hole 67.

On the other hand, as shown in FIG. 3(a), a pair of boot locking projections 71 are provided on the holding flange portion 27 of the crimping sleeve 29 so as to project therefrom, while holding the holding flange portion 27 therebetween. The pair of boot locking projections 71 are fitted individually in the projection locking holes 69 in the locking flange portion 35 which is held between the holding flange portion 27 and the rear wall inner surface 25.

In the optical connector 11 according to the first embodiment, the pair of projection locking holes 69 and the boot locking projections 71 are both provided in such a way as to hold the tubular portion 23 therebetween, whereby the locking flange portion 35 is locked by the boot locking projections 71 at both diametrical sides thereof which face each other across the center of the optical fiber cable 13. Thus, the locking flange portion 35 is locked stably without being deformed in a distorted fashion.

Additionally, in the optical connector 11, a projection length of the boot locking projections 71 is set smaller than a thickness of the locking flange portion 35. This allows the holding flange portion 27 of the crimping sleeve 29 to press the locking flange portion 35 before the boot locking projections 71 are brought into abutment with the rear wall inner surface 25 when the optical fiber cable 13 is pulled, whereby the locking flange portion 35 can be prevented from being dislocated by both the holding force and the locking both.

Next, the operation of the optical connector 11 will be described which is configured in the way described heretofore.

In fabricating the optical connector 11 according to the first embodiment, the boot 37, the crimping ring 33 and the crimping sleeve 29 are sequentially placed on the end portion of the optical fiber cable 13. Then, the optical fiber core wires 15 which are exposed by removing the sheathing 43 and the tensile strength fiber 31 are inserted into the inside of the tubular portion 23 of the crimping sleeve 29. Then, the tensile strength fiber 31 and the sheathing 43 of the optical fiber cable 13 are fastened to be fixed to the outer circumference of the tubular portion 23 of the crimping sleeve 29 by the crimping ring 33 which is crimped.

The crimping sleeve 29 which is fixed to the optical fiber cable 13 faces the rear wall inner surface 25 in the interior of the housing 19, whereby the crimping sleeve 29 is prevented from being dislocated from the housing 19 by the holding flange portion 27 thereof. In the boot 37 which covers part of the optical fiber cable 13 and the crimping ring 33 with the projecting portion, the locking flange portion 35 which is provided to continue to the protecting portion via the sleeve through hole 21 is held between the holding flange portion 27 of the crimping sleeve 29 and the rear wall inner surface 25 of the housing 19.

Additionally, the boot locking projections 71 which are provided on the holding flange portion 27 so as to project therefrom are inserted into the projection locking holes 69 which are formed in the locking flange portion 35.

In the optical connector 11 which is fabricated in this way, when the boot 37 is pulled alone, the locking flange portion 35 which is held between the holding flange portion 27 and the rear wall inner surface 25 is pulled towards the direction of the sleeve through hole 21. When the locking flange portion 35 is pulled towards the sleeve through hole 21, the projection locking holes 69 move radially inwards to be locked by the boot locking projections 71, whereby the locking flange portion 35 is prevented from being dislocated from the sleeve through hole 21.

Additionally, when the optical fiber cable 13 is pulled to the rear (rightwards in FIG. 2) as a result of the optical fiber cable is bent or the like, the holding flange portion 27 of the crimping sleeve 29 which is fixed by the crimping ring 33 is pressed against the rear wall inner surface 25. The holding flange portion 27 which is pressed against the rear wall inner surface 25 holds the locking flange portion 35 of the boot 37 together with the rear wall inner surface 25, and the boot locking projections 71 are brought into press contact with the rear wall inner surface 25. Therefore, the dislocation of the locking flange portion 35 is prevented in a more ensured fashion.

Then, in the optical connector 11 of the first embodiment, when the crimping ring 33 is crimped on to the outer circumference of the tubular portion 23, only the tensile strength fiber 31 from which the sheathing 43 is removed and which supports mainly the tensile load of the optical fiber cable 13 is held between the tensile strength material holding projections 53a, 53b and the crimping ring 33 at the axial front side of the tubular portion 23. In this state, as shown in FIG. 5(b), the tensile strength fiber 31 is bent into a shape which follows the projecting shapes of the tensile strength material holding projections 53*a*, 53*b*, and the crimping ring 33 is elastically deformed on to the tensile strength fiber 31 from thereover substantially in the same shape and is then fastened thereto. Namely, the tensile strength fiber 31 and the crimping ring 33 are placed over the tensile strength material holding projections 53*a*, 53*b* while being bent to follow the shapes thereof. This enables the tensile strength fiber 31 to exhibit high tensile strength friction which involves no slip when the tensile strength fiber 31 is pulled in the axial direction relative to the tubular portion 23, the tensile strength fiber 31 can be fixed with higher strength than when the tensile strength fiber 31 is held together with the sheathing 43 in the double-layer fashion. Additionally, at the axial rear side of the tubular portion 23, the tensile strength fiber 31 and the sheathing 43 are held simultaneously between the sheathing holding projection 55 and the crimping sleeve 29, whereby the tensile load to the sheathing 43 is supported. This can enhance the tensile strength of the optical fiber cable 13 relative to the housing 19.

In the first embodiment, the tensile strength fiber 31 and the crimping ring 33 enter the tensile strength material cut-in groove 57 which is formed between the pair of tensile strength material holding projections 53*a*, 53*b* to be deformed. When it is pulled in the axial direction relative to the tubular portion 23, the tensile strength fiber 31 exhibits higher tensile strength friction which produces no slip thereof in relation to the outer circumferential surface of the tubular portion 23, whereby the tensile strength fiber 31 is fixed to the tubular portion 23 with high strength. Additionally, since the sheathing cut-in groove 59 is formed larger in groove width than the tensile strength material cut-in groove 57, the sheathing 43 which is deformed by being crimped becomes easy to be accommodated in the sheathing cut-in groove 59, whereby it can be made difficult for the extra length of the sheathing 43 to influence the crimping construction of the tensile strength fiber 31. This makes it possible to crimp the tensile strength fiber 31 in a more ensured fashion.

In the first embodiment, since the height of the sheathing holding projection 55 on the crimping sleeve 29 is made smaller by the extent equal to the thickness of the sheathing 43 than the height of the tensile strength material holding projections 53*a*, 53*b*, an outside diameter of the crimping ring 33 after crimped can be made substantially equal at the axial front side and the axial rear side of the tubular portion 23. This can simplify the construction of the boot 37, thereby improving the installation of the boot 37.

A comparison was made between the optical connector which uses the conventional crimping sleeve on which the tensile strength material holding projections 53*a*, 53*b* are not provided independently and the optical connector 11 which uses the crimping sleeve 29 of the first embodiment on which the tensile strength material holding projections 53*a*, 53*b* and the sheathing holding projection 55 are provided independently with respect to the tensile strength of the cable relative to the housing 19. As a result of the comparison, in the conventional optical connector, the maximum tensile strength is 173.5 N, the maximum tensile strength 123.7 N, and the average tensile strength 148.5 N. On the other hand, in the optical connector 11 of the first embodiment, the maximum tensile strength is 259.7 N, the maximum tensile strength 201.3 N, and the average tensile strength 231.3 N. Thus, it is known that the optical connector 11 of the first embodiment has the cable tensile strength which is about 1.5 times that of the conventional optical connector.

Next, referring to FIGS. 6 and 7(*a*), 7(*b*), an optical connector 111 according to a second embodiment of the invention will be described.

Figure 6:
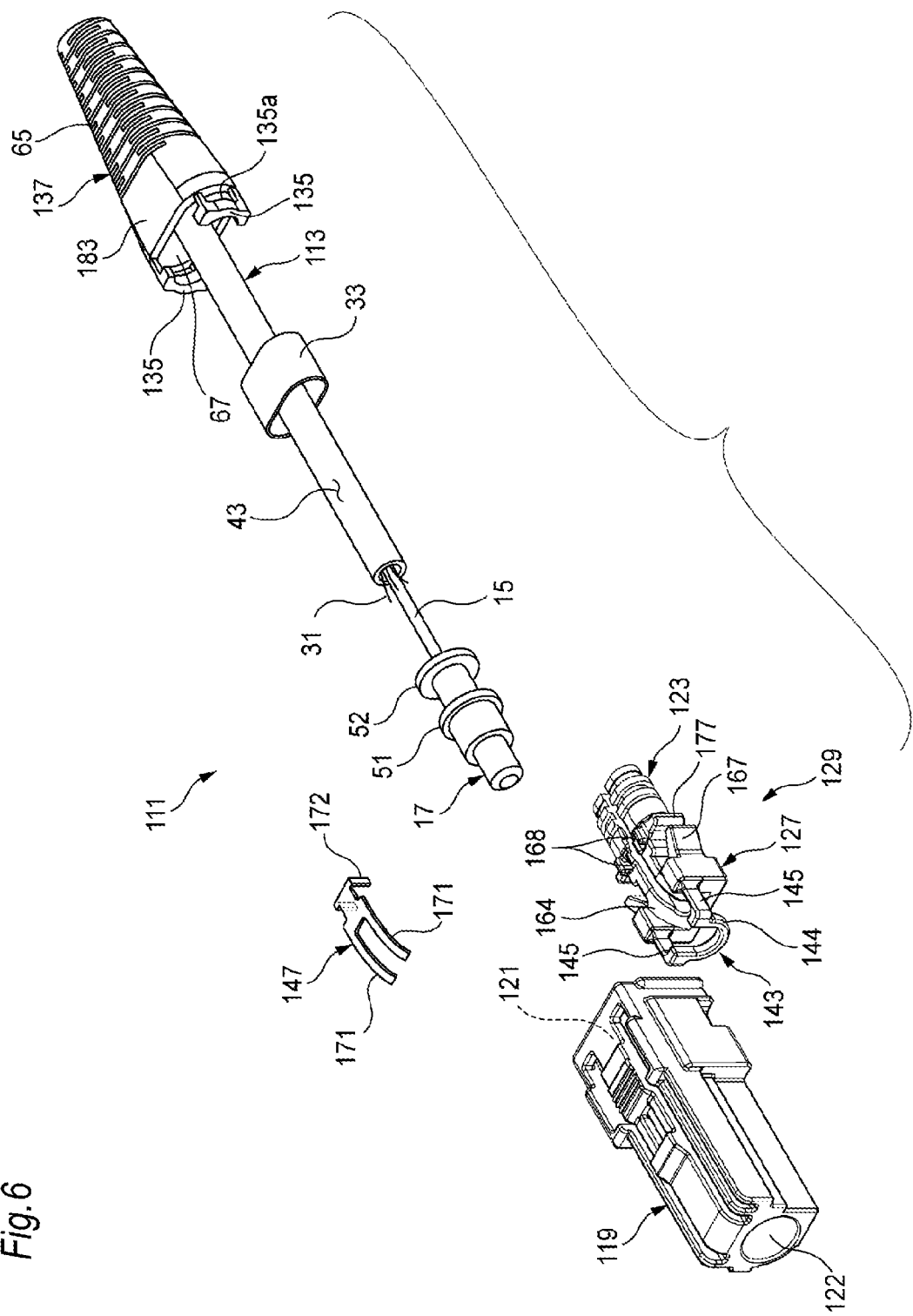
FIG. 6 is an exploded perspective view of an optical connector according to a second embodiment of the invention.
Figure 8:
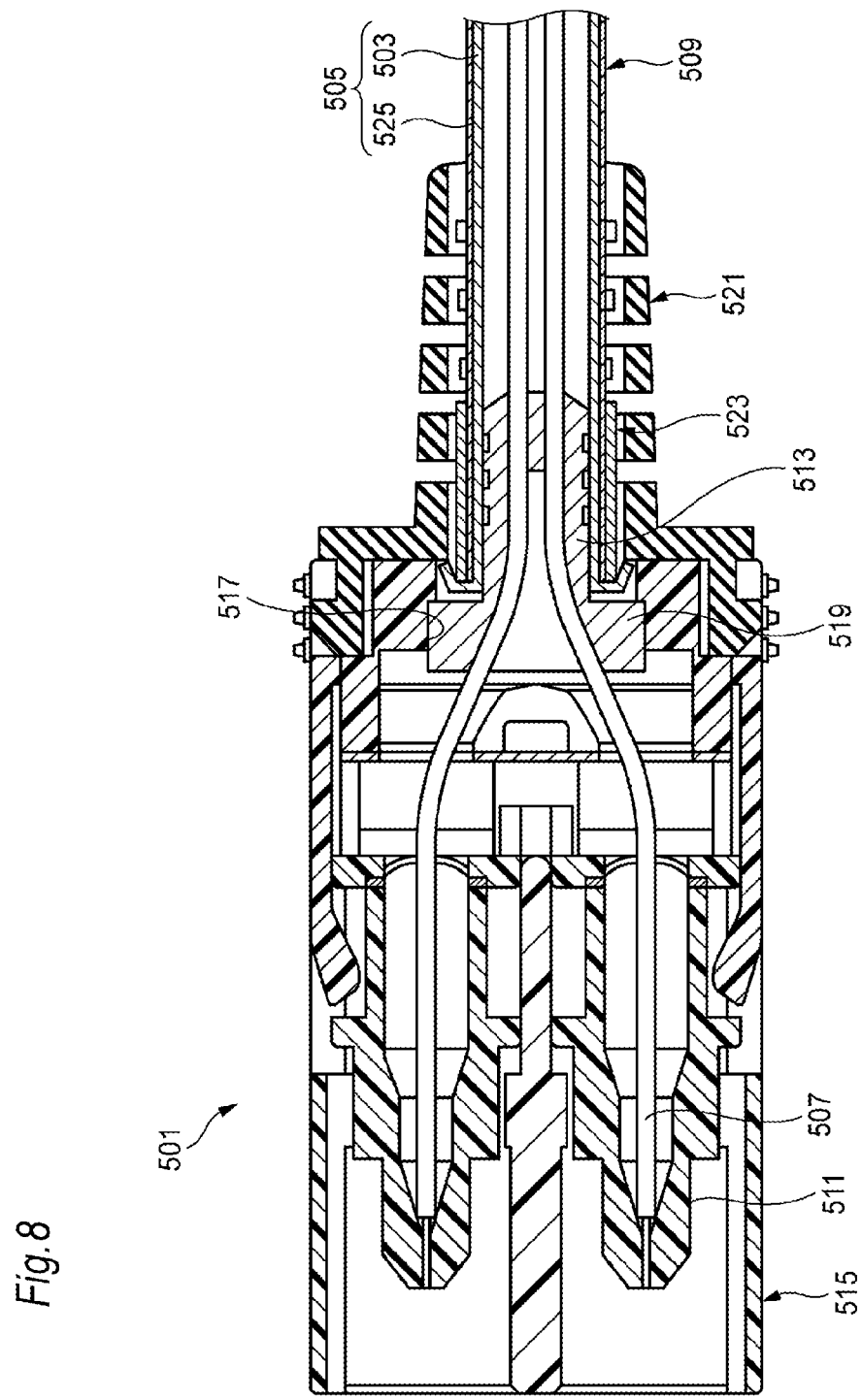
FIG. 8 is a longitudinal horizontal sectional view of a conventional optical connector.

As shown in FIG. 6, the optical connector 111 according to the second embodiment includes a housing 119 which accommodates a ferrule 17 which is connected to a distal end portion of an optical fiber core wire 15 of an optical fiber cable 113, a ferrule holding member (a crimping sleeve) 129 having a tubular portion 123 through which the optical fiber core wire 15 is inserted inwardly and which is inserted through a rear opening 121 which is formed in a rear wall of the housing 119 and a holding member main body portion 127 which is provided continuously to the tubular portion 123 and which is accommodated in the housing 119, a crimping ring 33 which fixes a tensile strength fiber 31 and a sheathing 43 of the optical fiber cable 113 which are placed on an outer circumference of the tubular portion 123, and a boot 137 having a protecting portion 183 which covers outer circumferences of the optical fiber cable 113 and the crimping ring 33 and a pair of hooking projections 135 which are provided continuously to both sides of a proximal end of the protecting portion 183.

The optical connector 111 according to the second embodiment differs from the optical fiber connector 11 of the first embodiment in that the optical connector 111 is an optical connector which is attached to a cable distal end portion of the optical fiber cable 113 in which the single optical fiber core wire 15 and the tensile strength fiber 31 are covered by the sheathing 43, and the ferrule holding member 129 is used as the crimping sleeve having the tubular portion 123.

The housing 119, which is made of synthetic resin, has one joining opening portion 122 with a mating optical connector, not show, at the front thereof. A rear opening 121 is formed at the rear of the housing 119. The single ferrule 17 which is held by the ferrule holding member 129 is inserted into a deep side of the joining opening portion 122 from the rear opening 121 to be accommodated in the housing 119.

A holding member accommodating space is defined inside the housing 119, and the holding member main body portion 127 of the ferrule holding member 129 is accommodated in this holding member accommodating space. The ferrule holding member 129 of which the holding member main body portion 127 is accommodated in the holding member accommodating space is installed in the housing 119 with the tubular portion 123 projecting from the rear opening 121.

As shown in FIGS. 7(*a*), (*b*), the ferrule holding member 129 is made of a hard resin material and has the holding member main body portion 127 on which one fiber insertion groove 166 is formed into which the optical fiber core wire 15 is placed inwards. The fiber insertion groove 166 is provided so as to be depressed along a longitudinal direction of a holding member side surface 164. The tubular portion 123 is provided at a rear end of the holding member main body portion 127 so as to project to the rear. The fiber insertion groove 166 extends inwards of the tubular portion 123. The ferrule holding member 129 is accommodated in the housing 119 with the optical fiber core wire 15 inserted through the fiber insertion groove 166, and the tubular portion 123 is let out from the rear opening 121 of the housing 119.

The ferrule holding member 129 is installed in the housing 119 so as to position and hold the ferrule 17 and the optical fiber core wire 15 in the housing 119. A support portion 143 is provided at a holding member distal end portion 151 of the ferrule holding member 129, and the support portion 143 locks a second annular portion 52 to thereby restrict the ferrule 17 from moving towards a distal end of the housing 119. The support portion 143 has a U-shaped support portion 144 which extends along an outer circumferential surface of the ferrule 17 and a pair of connecting support portion 145 which connects continuously both ends of the U-shaped support portion 144 to the holding member distal end portion 151. The U-shaped support portion 144 is formed into a semi-cylindrical shape so that the ferrule 17 is rested thereon to be supported from therebelow.

A pair of spring fixing portions 168 are formed on the holding member side surface 164 of the holding member main body portion 127 so as to face each other across the fiber insertion groove 166. Engaging pieces 172 (refer to FIG. 6) of a spring member 147, which will be described later, are fitted individually in the spring fixing portions 168.

The tubular portion 123 from which the optical fiber core wire 15 is let out is provided at a holding member rear end portion 169 of the ferrule holding member 129, and the tensile strength fiber 31 and the sheathing 139 of the optical fiber cable 113 are fixed to the tubular portion 123 by the crimping ring 33.

A tensile strength material holding projections 153a, 153b and a sheathing holding projection 155 are provided on an outer circumference of the tubular portion 123. The tensile strength material holding projections 153a, 153b are covered by the tensile strength resin 31 from which the sheathing 43 is removed. Additionally, the sheathing holding projection 155 is formed rearwards of the tensile strength material holding projections 153a, 153b and is covered by the tensile strength fiber 31 and the sheathing 43.

Additionally, a tensile strength material cut-in groove 157 is formed between the tensile strength material holding projections 153a, 153b which are provided on the tubular portion 123 along an axial direction thereof. A sheathing cut-in groove 159 having a groove width wider than that of the tensile strength material cut-in groove 157 is formed between the rear tensile strength material holding projection 153b and the sheathing holding projection 155.

In the second embodiment, too, due to the tensile strength material holding projections 153a, 153b and the sheathing holding projection 155 being provided on the tubular portion 123 independently, the tubular portion 123 of the ferrule holding member 129 is made to crimp concentrically the tensile strength fiber 31 only. Additionally, the sheathing holding projection 155 prevents the slip of the sheathing 43 which would occur as a result of only the sheathing 43 being pulled. In the second embodiment, the fiber insertion groove 166 is formed in the form of a cut so as to cut apart the tensile strength holding projections 153a, 153b and the sheathing holding projection 155. This enables the optical fiber core wire 15 to be inserted in the fiber insertion groove 166 in a direction which is at right angles to a fiber axis. Namely, as in the case with a closed cylindrical member, the optical fiber core wire 15 does not have to be passed inwards in advance.

Elastic locking pieces 167 and boot locking projections 177 are provided individually on outer side portions 165 on both sides of the holding member main body portion 127. Front ends of the elastic locking pieces 167 connect to the holding member main body portion 127, and rear ends thereof gradually move away from each other to constitute free ends. Namely, the elastic locking pieces 167 expand substantially into a V-shape as viewed from thereabove (refer to FIG. 7(a)). Distal ends of the free ends are formed as locking claws 167a. The elastic locking pieces 167 can elastically be deformed in directions in which the locking claws 167a move towards and away from the corresponding outer side portions 165. The locking claws 167a are locked on locking step portions (not shown) which are provided inside the housing 119. The boot locking projections 177 project perpendicularly outwards from respective the corresponding outer side portions 165 of the rear ends of the holding member main body portion 127.

As shown in FIG. 6, the spring member 147 is made up of a thin plate of a metallic material or a resin material having high spring properties. The spring member 147 has a pair of parallel elastic arm pieces 171. The optical fiber core wire 15 is disposed between the elastic arm pieces 171. The elastic arm pieces 171 push on the second annular portion 52 to the front with distal ends thereof. The spring member 147 has the pair of engaging piece portions 172 which are bent vertically downwards at an opposite side to the elastic arm pieces 171, and the engaging piece portions 172 are brought into engagement with the spring fixing portions 168 which are formed on the holding member main body portion 127. The spring member 147 is prevented from being dislocated from the ferrule holding member 129 by the engaging piece portions 172 being brought into engagement with the spring fixing portions 168 and is installed on the ferrule holding member 129 while covering the fiber insertion groove 166.

As shown in FIG. 6, the boot 137 is made of a soft material such as a synthetic rubber and has a protecting portion 183 which covers outer circumferences of the optical fiber cable 113 and the metallic crimping ring 33. A ring accommodating hole 67 is formed at a proximal end of the protecting portion 183. The ring accommodating hole 67 covers the crimping ring 33 which fastens and fixes the tensile strength fiber 31 and the sheathing 43 of the optical fiber cable 113 to the tubular portion 123 from an outer circumferential side thereof. A plurality of circumferential grooves 65 are formed on a circumference of the protecting portion 183 to impart an appropriate bending characteristic to the protecting portion 183.

The pair of hooking projections 135 are provided at both the sides of a proximal end of the protecting portion 183 so as to project to the front (inside of the housing). The hooking projections 135 are flexible so as to expand outwards freely to thereby allow distal ends thereof to be displaced outwards due to their flexibility. Then, by inserting the boot locking projections 177 into opening portions 135a of the hooking projections 135, the boot 137 is prevented from being dislocated from the ferrule holding member 129.

Finally, the ferrule holding member 129 on which the boot 137 is locked is installed in the housing 119 from the rear opening 121 thereof, this completing the fabrication of the optical connector 111.

Namely, according to the optical connector 111 of the second embodiment, as with the optical connector 11 of the first embodiment, when the crimping ring 33 is crimped on to the outer circumference of the tubular portion 123, only the tensile strength fiber 31 from which the sheathing 43 is removed and which supports mainly the tensile load of the optical fiber cable 113 is held between the tensile strength material holding projections 153a, 153b and the crimping ring 33 at the axial front side of the tubular portion 123. In this held state, the tensile strength fiber 31 is bent into the shape which follows the projecting shapes of the tensile strength material holding projections 153a, 153b, and the crimping ring 33 is elastically deformed substantially into the same shape from thereabove to thereby be fastened thereto. Namely, the tensile strength fiber 31 and the crimping ring 33 are bent to follow the tensile strength material holding projections 153a, 153b and are placed thereover. This enables the tensile strength fiber 31 to exhibit the high tensile strength friction which involves no slip when the tensile strength fiber 31 is pulled in the axial direction relative to the tubular portion 123, whereby the tensile strength fiber 31 can be fixed with the higher strength than when the tensile strength fiber 31 is held together with the sheathing 43 in the double-layer fashion. At the axial rear side of the tubular portion 123, the tensile strength fiber 31 and the sheathing 43 are held altogether between the sheathing holding projection 155 and the ferrule holding member 129, whereby the tensile load on the sheathing 43 is supported. This can enhance the tensile strength of the optical fiber cable 113 relative to the housing 119.

Additionally, in the optical connector 111 of the second embodiment, too, the tensile strength fiber 31 and the crimping ring 33 enter the tensile strength material cut-in groove 157 which is formed between the pair of tensile strength material holding projections 153a, 153b to thereby be deformed. When the tensile strength fiber 31 is pulled in the axial direction relative to the tubular portion 123, the tensile strength fiber 31 exhibits the higher tensile strength friction which causes no slip relative to the outer circumferential surface of the tubular portion 123, whereby the tensile strength fiber 31 is fixed with the high strength. Additionally, since the sheathing cut-in groove 159 is larger in groove width than the tensile strength material cut-in groove 157, the sheathing 43 which is crimped to be deformed is easily accommodated in the sheathing cut-in groove 159, whereby it can be made difficult for the extra length of the sheathing 43 to influence the crimping construction of the tensile strength fiber 31. This makes it possible to crimp the tensile strength fiber 31 in a more ensured fashion.

In addition, in the second embodiment, since the height of the sheathing holding projection 155 on the ferrule holding member 129 is made smaller by an extent equal to a thickness of the sheathing 43 than the height of the tensile strength material holding projections 153a, 153b, an outside diameter of the crimping ring 33 after crimped can be made substantially equal at the axial front side and the axial rear side of the tubular portion 123. This can simplify the construction of the boot 137, thereby improving the installation of the boot 137.

Consequently, according to the optical connectors 11, 111 of the first and second embodiments, the cable tensile strength relative to the housings 19, 119 can be enhanced.

The optical connector of the invention is not limited to the embodiments described heretofore and hence can be modified or improved as required. In addition, the materials, shapes, numbers and locations of the constituent elements in the embodiments should be arbitrary and no limitation is imposed thereon, provided that the invention can be achieved therewith.

Here, the characteristics of the embodiments of the optical connector according to the invention will be briefly itemized as under [1] to [3] below.

[1] The optical connector 11 comprising: the optical fiber cable 13 in which the optical fiber core wires 15 and the tensile strength material (the tensile strength fiber) 31 which is provided along the optical fiber core wires 15 are covered by the sheathing 43; the ferrules 17 which are fixed to the end portions of the optical fiber core wires 15 which are exposed from the sheathing 43; the housing 19 which holds the ferrules 17 at the front thereof; the crimping sleeve 29 having the tubular portion 23 through which the optical fiber core wires 15 are inserted and which are let out from the rear opening (the sleeve through hole) 21 in the housing 19, the tensile strength material holding projections 53a, 53b which are formed on the outer circumference of the tubular portion 23 to be covered by the tensile strength material (the tensile strength fiber) 31 from which the sheathing 43 is removed, and the sheathing holding projection 55 which is formed on the outer circumference of the tubular portion 23 so as to lie further rearwards than the tensile strength material holding projections 53a, 53b to be covered by the tensile strength material (the tensile strength fiber) 31 and the sheathing 43; and the crimping ring 33 which is crimped on to the tubular portion 23 not only to thereby hold the tensile strength material (the tensile strength fiber) 31 between the tensile strength material holding projections 53a, 53b and itself but also to thereby hold the tensile strength material (the tensile strength fiber) 31 and the sheathing 43 between the sheathing holding projection 55 and itself.

[2] The optical connector 11 according to the configuration described under [1] above, the tensile strength material cut-in groove 57 is formed between the plurality of tensile strength material holding projections 53a, 53b which are provided along the axial direction of the tubular portion 23, and the sheathing cut-in groove 59 having the wider groove width than that of the tensile strength material cut-in groove 57 is formed between the tensile strength material holding projection 53b which is provided rearwards and the sheathing holding projection 55.

[3] The optical connector 11 according to the configuration as described under [1] or [2] above, the projecting height of the sheathing holding projection 55 from the outer circumference of the tubular portion 23 is smaller than the projecting height of the tensile strength material holding projections 53a, 53b from the outer circumference of the tubular portion 23.

According to the optical connector of the invention, it is possible to enhance the cable tensile strength of the optical fiber cable relative to the housing.

What is claimed is:
1. An optical connector comprising:
an optical fiber cable in which an optical fiber core wire and a tensile strength material which is provided along the optical fiber core wire are covered by a sheathing;
a ferrule which is fixed to an end portion of the optical fiber core wire which is exposed from the sheathing;
a housing which holds the ferrule at a front thereof;
a crimping sleeve which includes: a tubular portion through which the optical fiber core wire is inserted and which is let out from a rear opening in the housing; a tensile strength material holding projection which is formed on an outer circumference of the tubular portion and which is covered by the tensile strength material from which the sheathing is removed; a sheathing holding projection which is formed on the outer circumference of the tubular portion so as to lie further rearwards than the tensile strength material holding projection and which is covered by the tensile strength material and the sheathing; and a holding flange portion connected to a front end of the tubular portion; and
a crimping ring which is crimped on to the tubular portion not only to thereby hold the tensile strength material between the tensile strength material holding projection and the crimping ring but also to thereby hold the tensile strength material and the sheathing between the sheathing holding projection and the crimping ring, wherein the holding flange portion of the crimping sleeve is received inside the housing,
a tensile strength material cut-in groove is formed between a plurality of the tensile strength material holding projections which are provided along an axial direction of the tubular portion, and
a sheathing cut-in groove having a wider groove width than that of the tensile strength material cut-in groove is formed between the tensile strength material holding projection which is provided rearwards and the sheathing holding projection.

2. The optical connector according to claim 1, wherein a projecting height of the sheathing holding projection from the outer circumference of the tubular portion is smaller than a projecting height of the tensile strength material holding projection from the outer circumference of the tubular portion.

3. The optical connector according to claim 1, wherein the housing includes a rear wall having an inside surface, and the holding flange portion faces the inside surface of the rear wall.

4. The optical connector according to claim 3, further comprising
a boot including a protecting portion which covers the optical fiber cable and an outer circumference of the crimping ring, and a locking flange portion continuing to the protecting portion and which is held between the holding flange portion and inner surface of the rear wall.

5. The optical connector according to claim 4, wherein the boot further includes a pair of projection locking holes formed in the locking flange portion, and
the crimping sleeve further includes a pair of boot locking projections which project from the holding flange portion, and are received in a respective one of the projection locking holes.

6. The optical connector according to claim 1, wherein the crimping sleeve further includes a pair of recess portions which are formed on an upper edge of the holding flange portion.

* * * * *